(12) United States Patent
Jung et al.

(10) Patent No.: US 7,247,404 B2
(45) Date of Patent: Jul. 24, 2007

(54) ELECTROLYTE FOR LITHIUM SECONDARY BATTERIES AND LITHIUM SECONDARY BATTERY COMPRISING THE SAME

(75) Inventors: Yongju Jung, Suwon (KR); Seok Kim, Incheon (KR); Jan-Dee Kim, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 628 days.

(21) Appl. No.: 10/659,363

(22) Filed: Sep. 11, 2003

(65) Prior Publication Data

US 2004/0053129 A1    Mar. 18, 2004

(30) Foreign Application Priority Data

Sep. 12, 2002    (KR) ...................... 10-2002-0055319

(51) Int. Cl.
*H01M 6/04*    (2006.01)
(52) U.S. Cl. ...................... 429/199; 429/337; 429/341; 429/332; 429/328; 429/329; 429/218.1; 429/231.95; 252/62.2
(58) Field of Classification Search ............... 252/62.2; 429/199, 231.95, 322, 323, 337, 341, 332, 429/328, 329, 218.1
See application file for complete search history.

(56) References Cited

U.S. PATENT DOCUMENTS

| | | | |
|---|---|---|---|
| 4,520,084 A | 5/1985 | Tinker et al. | |
| 4,753,859 A * | 6/1988 | Brand et al. | ................. 429/201 |
| 5,827,602 A | 10/1998 | Koch et al. | ................. 429/194 |
| 6,030,720 A | 2/2000 | Chu et al. | ................... 429/105 |

FOREIGN PATENT DOCUMENTS

| | | | |
|---|---|---|---|
| JP | 2-281572 | * | 11/1990 |
| JP | 10-168028 | | 6/1998 |

* cited by examiner

*Primary Examiner*—Laura Weiner
(74) *Attorney, Agent, or Firm*—Stein, McEwen & Bui, LLP

(57) ABSTRACT

An electrolyte in a lithium secondary battery includes an alkyl ammonium salt having a cation of the following Formula 1, a lithium salt, and an organic solvent:

Formula 1

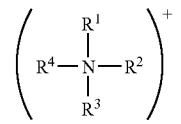

wherein $R^1$ to $R^4$ are independently a $C_1$ to $C_6$ alkyl, a $C_2$ to $C_6$ alkenyl, or substituents thereof. The lithium secondary battery has improved cycle life, high rate characteristics, and a high energy density due to an increase of the average discharge voltage at a high rate.

14 Claims, 3 Drawing Sheets

ELECTROLYTE FOR LITHIUM SECONDARY BATTERIES AND LITHIUM SECONDARY BATTERY COMPRISING THE SAME

CROSS-REFERENCE TO RELATED APPLICATIONS

This application is based on Korea Patent Application No. 2002-55319 filed on Sep. 12, 2002 in the Korean Intellectual Property Office, the content of which is incorporated herein by reference.

BACKGROUND OF THE INVENTION

1. Field of the Invention

The present invention relates to an electrolyte for a lithium secondary battery and a lithium secondary battery comprising the same, and more specifically, to an electrolyte for use in a lithium-sulfur battery having excellent electrochemical properties such as battery capacity, high rate performance, cycle life, and energy density due to improved average discharge voltage.

2. Description of the Related Art

The development of portable electronic devices has led to a corresponding increase in the demand for secondary batteries having both a lighter weight and a higher capacity. To satisfy these demands, the most promising approach is a lithium-sulfur battery with a positive electrode made of sulfur-based compounds.

Lithium-sulfur batteries use sulfur-based compounds with sulfur-sulfur bonds as a positive active material, and a lithium metal or a carbon-based compound as a negative active material. The carbon-based compound is one which can reversibly intercalate or deintercalate metal ions, such as lithium ions. Upon discharging (i.e., electrochemical reduction), the sulfur-sulfur bonds are cleaved, resulting in a decrease in the oxidation number of sulfur (S). Upon recharging (i.e., electrochemical oxidation), the sulfur-sulfur bonds are re-formed, resulting in an increase in the oxidation number of the S. The electrical energy is stored in the battery as chemical energy during charging, and is converted back to electrical energy during discharging.

With respect to specific density, the lithium-sulfur battery is the most attractive among the currently developing batteries since lithium has a specific capacity of 3,830 mAh/g, and sulfur has a specific capacity of 1,675 mAh/g. Further, the sulfur-based compounds are less costly than other materials and are environmentally friendly.

Nevertheless, no lithium-sulfur batteries have yet been made widely commercially available. One reason these batteries have not been able to be commercialized is due to the poor sulfur utilization over repeated cycling, resulting in a low capacity. The sulfur utilization is referred to as a ratio of the amount of the sulfur involved in the electrochemical redox reaction of batteries to the amount of total injected sulfur. Further, the sulfur is diffused away to electrolytes upon the redox reaction, deteriorating the cycle life characteristics. Accordingly, unless the electrolyte is suitable, the reduced product of the sulfur, lithium sulfide ($Li_2S$), is deposited, and as a result does not participate in further electrochemical reactions.

U.S. Pat. No. 6,030,720 describes liquid electrolyte solvents, including a main solvent having the general formula $R_1(CH_2CH_2O)_nR_2$, where n ranges between 2 and 10, $R_1$ and $R_2$ are different or identical alkyl or alkoxy groups, and having a donor solvent of a donor number of 15 or more.

Further, the main solvent includes a liquid electrolyte solvent that includes a solvent having at least one of a crown ether, a cryptand, and a donor solvent, which are solvents generating a catholyte after discharging. Despite using this kind of electrolyte, however, lithium-sulfur batteries have failed to obtain satisfactory capacity, high rate performance, or cycle life characteristics.

According to current research, an electrolyte of salts and an organic solvent may provide lithium ion batteries with a high ion conductivity and a high oxidation potential. In such lithium ion batteries, lithium salts such as $LiClO_4$, $LiBF_4$, or $LiPF_6$ are mainly used. U.S. Pat. No. 5,827,602 describes non-aqueous batteries having lithium salts comprising triflate, imide, or methide-based anions. The aforementioned electrolyte shows good performance for lithium ion batteries. However, in lithium-sulfur batteries, the electrolyte causes problems by deteriorating the battery performance. This deterioration is due to the electrochemical reaction of the polysulfide being very unstable in a carbonate-based electrolyte, which is the most commonly used electrolyte in lithium-ion batteries. Thus, the lithium-sulfur batteries cannot effectively use the electrolyte present in the lithium-ion batteries. The electrolyte usable in lithium-sulfur batteries requires a stable electrochemical reaction with the polysulfide and requires the highly concentrated polysulfide generated by the reaction to be dissolvable. The characteristics of a lithium secondary battery depend on the kind and composition of salts and solvents. Up to now, the correct kind and composition of salts and solvents capable of improving cycle life and high rate characteristics of a lithium secondary battery, particularly a lithium-sulfur battery, have not been developed.

SUMMARY OF THE INVENTION

It is an aspect of the present invention to provide an electrolyte for a lithium-sulfur battery having good cycle life characteristics and high rate performance.

It is another aspect of the present invention to provide a lithium-sulfur battery comprising the electrolyte.

Additional aspects and advantages of the invention will be set forth in part in the description which follows, and in part, will be obvious from the description or may be learned by practice of the invention.

In order to realize the above and/or other aspects, the present invention provides an electrolyte to use in a lithium secondary battery that includes an alkyl ammonium salt having a cation of the following Formula 1, a lithium salt, and an organic solvent:

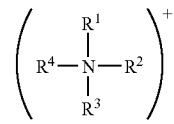

Formula 1 wherein $R^1$ to $R^4$ are independently a $C_1$ to $C_6$ alkyl, a $C_2$ to $C_6$ alkenyl, or substituents thereof.

According to another embodiment of the present invention, a lithium secondary battery includes an electrolyte comprising an alkyl ammonium salt having the Formula 1, a lithium salt, and an organic solvent.

BRIEF DESCRIPTION OF THE DRAWINGS

These and other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
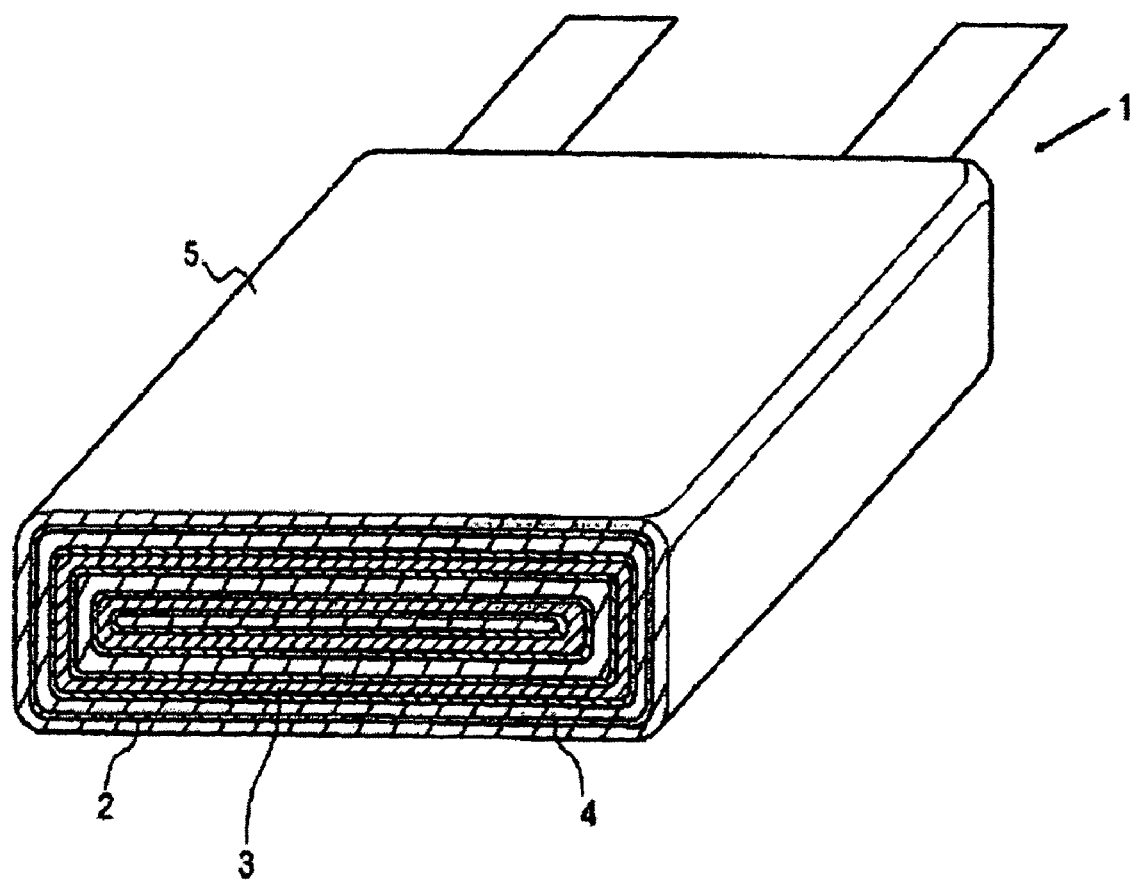
FIG. 1 is a perspective view of a battery according to an embodiment of the present invention.

Reference will now be made in detail to the present preferred embodiments of the present invention, examples of which are illustrated in the accompanying drawings, wherein like reference numerals refer to like elements throughout. The embodiments are described below in order to explain the present invention by referring to the figures.

When lithium-sulfur batteries are discharged, elemental sulfur ($S_8$) is reduced to generate sulfide ($S^{-2}$) or polysulfide ($S_n^{-1}$, $S_n^{-2}$, wherein, $n \geq 2$). Thus, lithium-sulfur batteries use the elemental sulfur, lithium sulfide ($Li_2S$), or lithium polysulfide ($Li_2S_n$, wherein n =2, 4, 6, or 8) as a positive active material. Among these, the elemental sulfur has a low polarity, while the lithium sulfide and the lithium polysulfide have a high polarity. Further, the lithium sulfide is present in a precipitated state, but lithium polysulfide is present in a dissolved state. In order to carry out an electrochemical reaction with the various states of the sulfur-based materials, it is important to select a suitable electrolyte to dissolve the various kinds of sulfur-based materials. Conventionally, the electrolyte used in lithium-sulfur batteries is an organic solvent that can dissolve solid-phase lithium salts.

According to a first embodiment of the present invention, the electrolyte used in a lithium secondary battery includes an alkyl ammonium salt having a cation the following Formula 1, a lithium salt, and an organic solvent:

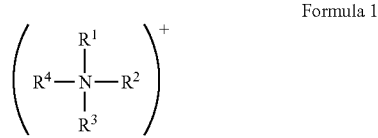

Formula 1 wherein $R^1$ to $R^4$ are independently a $C_1$ to $C_6$ alkyl, a $C_2$ to $C_6$ alkenyl, or substituents thereof.

The alkyl ammonium salt preferably includes a tetraalkyl ammonium cation such as a tetraethyl ammonium cation ($TEA^+$), a tetrabutyl ammonium cation ($TBA^+$), a tetrahexyl ammonium cation ($THA^+$) etc., or a substituted tetraethyl ammonium cation.

The anion to be linked with the cation is one selected from the group consisting of bis(perfluoroethylsulfonyl)imide ($N(C_2F_5SO_2)_2^-$, Beti), bis(trifluoromethylsulfonyl)imide ($N(CF_3SO_2)_2^-$, Im), tris(trifluoromethylsulfonyl)methide ($C(CF_3SO_2)_3^-$), trifluoromethane sulfonimide, trifluoromethylsulfonimide, trifluoromethylsulfonate, $AsF_9^-$, $ClO_4^-$, $PF_6^-$, and $BF_4^-$ The alkyl ammonium salt is used at a concentration of 0.1 M to 0.8 M. When the concentration of the alkyl ammonium salt is less than 0.1 M, high rate performance and cycle life characteristics deteriorate to less than those of a conventional electrolyte including only lithium salt. When the concentration is more than 0.8 M, the solubility of the alkyl ammonium salt is reduced, and thus conductivity of the electrolyte is deteriorated.

The alkyl ammonium salt is used at an amount of 1 to 15 wt % on the basis of total electrolyte. When the amount of the alkyl ammonium salt is less than 1 wt %, an addition effect is not realized, while when the amount is more than 15 wt %, a portion of the alkyl ammonium salt is not dissolved.

The electrolyte of preferred embodiments of the present invention further includes a lithium salt. Examples of the lithium salt includes $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (where x and y are natural numbers), $LiCl$, and $LiI$. Among them, lithium hexafluorophosphate ($LiPF_6$), lithium tetrafluoroborate ($LiBF_4$), lithium hexafluoroarsenate ($LiAsF_6$), lithium perchlorate ($LiClO_4$), lithium bis(trifluoromethylsulfonyl)imide ($LiN(CF_3SO_2)_2$), lithium bis(perfluoroethylsulfonyl) imide ($LiN(C_2F_5SO_2)_2$), lithium trifluorosulfonate ($CF_3SO_3Li$), and the like are preferred.

The lithium salt is used at a concentration of 0.1 to 2 M. When the concentration is more than 2 M, lithium salt is not totally dissolved and conductivity of the electrolyte decreases.

The alkyl ammonium salt and lithium salt are preferably used at a mole ratio of 1:9 to 8:2. When the mole ratio of the alkyl ammonium salt is less than 1/10, the high rate performance and cycle life characteristics deteriorate to less than those of a conventional electrolyte that includes only lithium salt. When the mole ratio is more than 8/10, the solubility of the alkyl ammonium salt is reduced, and thus conductivity of the electrolyte is deteriorated.

The electrolyte of the present invention includes an organic solvent. The organic solvent includes any conventional organic solvent used in a lithium secondary battery. Examples of the organic solvent for a lithium-sulfur battery include dimethoxy ethane, dioxolane, and the like. The content of the organic solvent is 70 to 98% by volume of total electrolyte. When the content of the organic solvent is less than 70% by volume, the viscosity of the electrolyte is excessively high. When the content of the organic solvent is more than 98% by volume, the concentration of the salt is excessively reduced, resulting in a decrease of electrolyte conductivity.

The organic solvent is either a single component solvent or a mixed organic solvent that includes two or more of the organic components as in the present inventive electrolyte. According to an embodiment of the invention using the mixed organic solvent, the mixed organic solvent includes at least two groups selected from a weak polar solvent group, a strong polar solvent group, and a lithium-protecting solvent group. However, the mixed organic solvent need not include the at least two groups in all circumstances.

The term "weak polar solvent," as used herein, relates to a solvent that dissolves elemental sulfur and having a dielectric constant of less than 15. The weak polar solvent is selected from an aryl compound, a bicyclic ether, or an acyclic carbonate.

The term "strong polar solvent," as used herein, relates to a solvent that dissolves lithium polysulfide and having a dielectric constant of more than 15. The strong polar solvent is selected from a bicyclic carbonate compound, a sulfoxide compound, a lactone compound, a ketone compound, an ester compound, a sulfate compound, or a sulfite compound.

The term "lithium-protecting solvent," as used herein, is defined as a solvent that provides the surface of the lithium metal with an effective protective layer (i.e., a stable solid-electrolyte interface (SEI) layer), and which has a cycle efficiency of 50% or more. The lithium-protecting solvent is selected from a saturated ether compound, an unsaturated ether compound, or a heterocyclic compound including N, O, or S, or a combination thereof.

Examples of the weak polar solvents include, but are not limited to, xylene, dimethoxyethane, 2-methyltetrahydrofuran, diethyl carbonate, dimethyl carbonate, toluene, dimethyl ether, diethyl ether, diglyme, tetraglyme, and the like.

Examples of the strong polar solvents include, but are not limited to, hexamethyl phosphoric triamide, γ-butyrolactone, acetonitrile, ethylene carbonate, propylene carbonate, N-methyl pyrrolidone, 3-methyl-2-oxazolidone, dimethyl formamide, sulfolane, dimethyl acetamide, dimethyl sulfoxide, dimethyl sulfate, ethylene glycol diacetate, dimethyl sulfite, ethylene glycol sulfite, and the like.

Examples of the lithium-protecting solvents include, but are not limited to, tetrahydrofuran, ethylene oxide, dioxolane, 3,5-dimethylisoxazole, 2,5-dimethyl furan, furan, 2-methylfuran, 1,4-oxane, 4-methyldioxolane, and the like.

As shown in FIG. 1, a lithium secondary battery 1 according to an embodiment of the present invention includes an electrode assembly 5 containing a positive electrode 2, a negative electrode 4, and a separator interposed between the positive electrode 2 and the negative electrode 4. The electrolyte 3 of the present invention is disposed between the positive and negative electrodes 2 and 4. The positive electrode 2 and negative electrode 4 are respectively fabricated by coating slurry including an active material, a binder material, and optionally a conductive material onto a current collector and compressing it. Any active material, binder material, and conductive material used in a conventional lithium secondary battery can be used in the battery of the present invention.

For example, in the case that the lithium secondary battery is a lithium-sulfur battery, a positive active material includes an elemental sulfur, $Li_2S_n$ ($n \geq 1$), $Li_2S_n$ ($n \geq 1$) dissolved in catholytes, an organosulfur compound, and a carbon-sulfur polymer (($C_2S_x)_n$: x=2.5~50, n≥2); and a negative active material includes a material to reversibly itercalate/deintercalate lithium ions, a material to reversibly form a lithium-containing compound by a reaction with lithium ions, a lithium metal, and a lithium alloy.

The lithium secondary battery comprising the electrolyte of the present invention has improved cycle life, high rate characteristics, and high energy density due to an increase of its average discharge voltage.

Hereinafter, the present invention is explained in detail with reference to specific examples. These specific examples, however, should not in any sense be interpreted as limiting the scope of the present invention and equivalents thereof.

EXAMPLE 1

67.5 wt % elemental sulfur, 11.4 wt % ketjen black as a conductive material, and 21.1 wt % polyethylene oxide as a binder were mixed in an acetonitrile solvent to prepare a positive active material slurry for a lithium-sulfur battery cell. The slurry was coated on a carbon-coated Al current collector. The slurry-coated current collector was dried in a vacuum oven at 60° C. for over 12 hours. Thus, the positive electrode with a current density of 2 mAh/cm₂ was prepared to 25×50 mm² in size.

The positive electrode, the vacuum-dried separator, and the negative electrode were laminated and transferred into a pouch. 0.7 M $LiSO_3CF_3$ and 0.3 M tetrabutylammonium hexafluorophosphate ($TBAPF_6$) were dissolved in a mixed solvent of dimethoxyethane/dioxolane in the volume ratio of 8:2 to obtain an electrolyte. The electrolyte was injected into said pouch. Then, the pouch was sealed, and the resultant pouch-type lithium-sulfur test cell was fabricated.

EXAMPLE 2

A cell was fabricated by the same procedure as described in Example 1, except that an electrolyte of 0.5 M $LiSO_3CF_3$ and 0.5 M tetrabutylammonium hexafluorophosphate ($TBAPF_6$) dissolved in a mixed solvent of dimethoxyethane/dioxolane in the volume ratio of 8:2 was used.

COMPARATIVE EXAMPLE 1

A cell was fabricated by the same procedure as described in Example 1, except that an electrolyte of 1.0 M $LiSO_3CF_3$ in a mixed solvent of dimethoxyethane/dioxolane (8:2 volume ratio) was used.

Evaluation of Electrochemical Characteristics

Cycle life characteristics of the test cells according to Examples 1 and 2 and Comparative Example 1 were evaluated at ambient temperature. The lithium-sulfur battery was initially discharged for 1 cycle at a discharging current density of 0.2 mA/cm², since the test cell had been charged on cell formation. To monitor the change of the capacity depending upon the discharge current, a charge current density was set to 0.4 mA/cm² and the discharge current density was varied to 0.2, 0.4, 1.0, and 2.0 mA/cm² (C-rate is 0.1 C, 0.2 C, 0.5 C, and 1 C, respectively) for 1 cycle, then the discharge current density was set to 1.0 mA/cm² (0.5 C), followed by charging and discharging for 30 cycles. The first to fifth cycles are cell formation processes, and the actual cycle life evaluation was carried out after the sixth cycle. The discharge cut-off voltage was set to 1.5~2.8 V.

Figure 2:
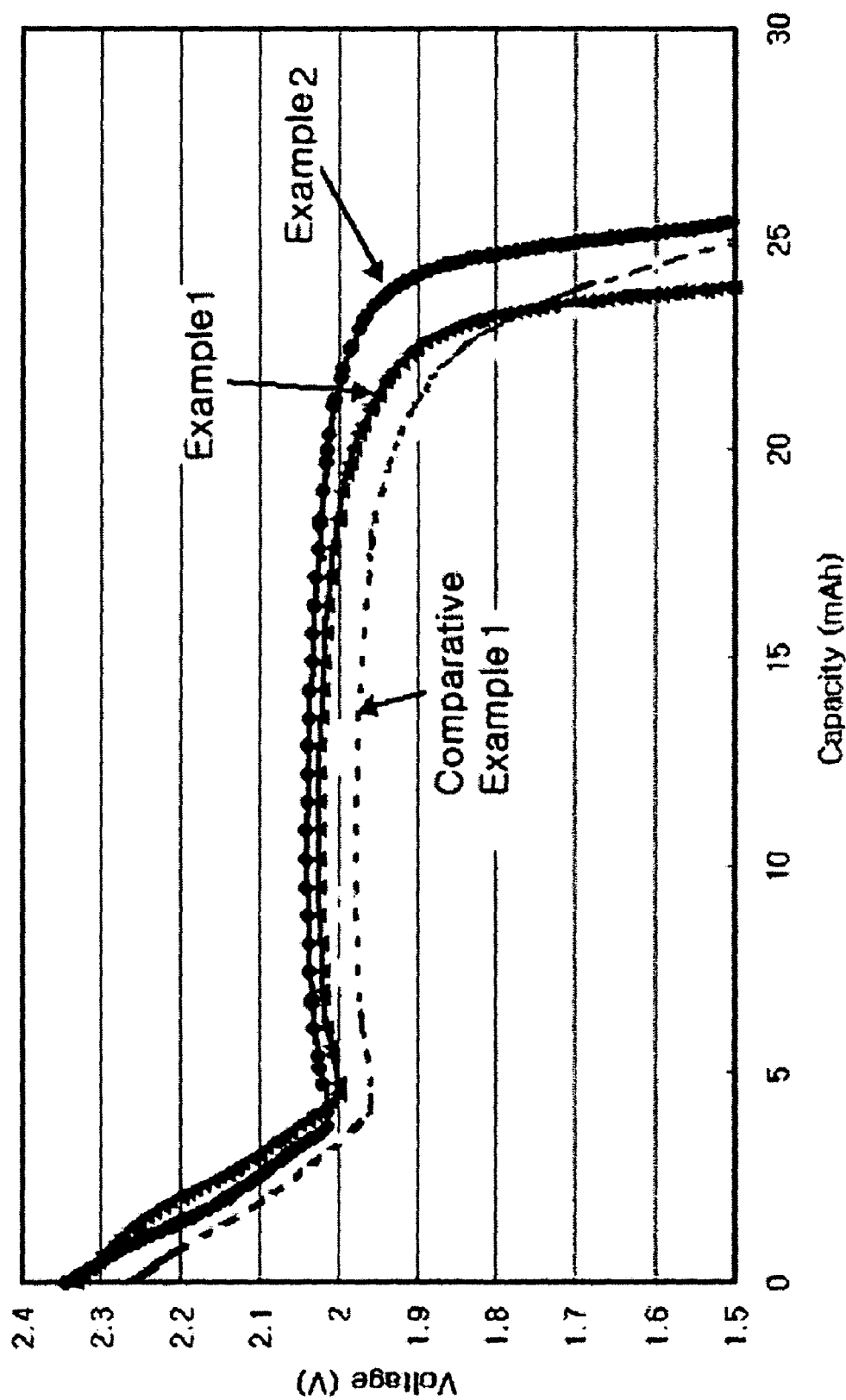
FIG. 2 illustrates a graph showing discharge characteristics of cells fabricated according to Examples 1, 2, and Comparative Example 1.
Figure 3:
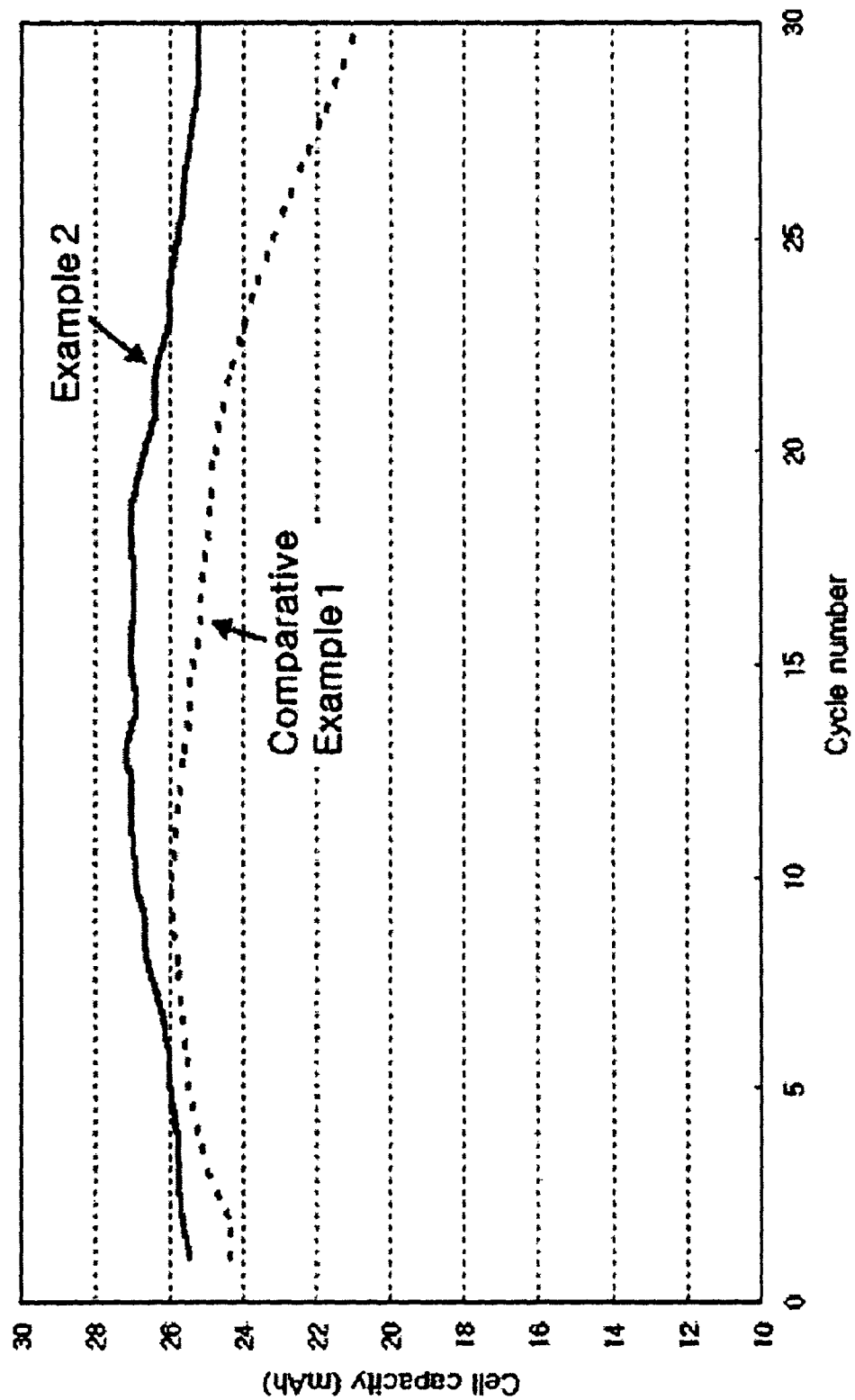
FIG. 3 illustrates a graph showing cycle life characteristics of cells fabricated according to Example 2 and Comparative Example 1.

FIG. 2 shows the discharge curve at the sixth cycle of cells according to Examples 1 and 2 and Comparative Example 1. As used herein, a mid-voltage refers to a voltage value located approximately midway between a zero capacity value and a maximum capacity value. As shown in FIG. 2, the cells according to the Examples 1 and 2 have higher mid-voltages than the cell of Comparative Example 1. FIG. 3 shows the cycle life characteristics by the number of cycles of cells according to Example 2 and Comparative Example 1. As shown in FIG. 3, the cell according to Example 2 has superior cycle life characteristics to the cell of Comparative Example 1.

The lithium secondary batteries according to the present invention have improved cycle life, high rate characteristics, and a high energy density due to an increase of the average discharge voltage at a high rate.

While the present invention has been described in detail with reference to the preferred embodiments, those skilled in the art will appreciate that various modifications and substitutions can be made thereto without departing from the spirit and scope of the present invention as set forth in the appended claims.

Although a few preferred embodiments of the present invention have been shown and described, it would be appreciated by those skilled in the art that changes may be made in this embodiment without departing from the principles and spirit of the invention, the scope of which is define in the claims and their equivalents.

What is claimed is:

1. An electrolyte for use in a lithium secondary battery, comprising an alkyl ammonium salt having a cation of the following Formula 1, a lithium salt, and an organic solvent:

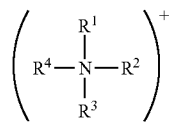

Formula 1 wherein $R^1$ to $R^4$ are independently a $C_1$ to $C_6$ alkyl, a $C_2$ to $C_6$ alkenyl, or substituents thereof, and wherein an anion to be linked with the cation is at least one selected from the group consisting of bis(perfluoroethylsulfonyl)imide $(N(C_2F_5SO_2)_2^-)$, bis(trifluoromethylsulfonyl)imide $(N(CF_3SO_2)_2^-)$, tris(trifluoromethylsulfonyl)methide $(C(CF_3SO_2)_3^-)$, trifluoromethane sulfonimide, trifluoromethylsulfonimide, trifluoromethylsulfonate, $AsF_9^-$, $ClO_4^-$, $PF_6^-$, and $BF_4^-$.

2. The electrolyte of claim 1, wherein the concentration of the alkyl ammonium salt is 0.1 M to 0.8 M.

3. The electrolyte of claim 1, wherein the amount of the alkyl ammonium salt used is 1 to 15 wt % on the basis of the total electrolyte.

4. The electrolyte of claim 1, wherein the lithium salt includes at least one of: $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (where x and y are numbers), LiCl, and LiI.

5. The electrolyte of claim 1, wherein the concentration of the lithium salt is 0.1 M to 2 M.

6. The electrolyte of claim 1, wherein the alkyl ammonium salt and the lithium salt are in a mole ratio of 1:9 to 2:8.

7. The electrolyte of claim 1, wherein the amount of the organic solvent used is 70 to 98% by volume of the total electrolyte.

8. The electrolyte of claim 1, wherein the organic solvent comprises at least two groups selected from a weak polar solvent group, a strong polar solvent group, and a lithium-protecting solvent group.

9. The electrolyte of claim 8, wherein:
the weak polar solvent is selected from an aryl compound, a bicyclic ether, and an acyclic carbonate;
the strong polar solvent is selected from a bicyclic carbonate compound, a sulfoxide compound, a lactone compound, a ketone compound, an ester compound, a sulfate compound, and a sulfite compound; and
the lithium-protecting solvent is selected from a saturated ether compound, an unsaturated ether compound, a heterocyclic compound including N, O, and S, and a combination thereof.

10. The electrolyte of claim 1, wherein the alkyl ammonium salt includes a tetraalkyl ammonium cation or a substituted tetraethyl ammonium cation.

11. The electrolyte of claim 1, wherein the tetraalkyl ammonium cation is selected from the group consisting of a tetraethyl ammonium cation $(TEA^+)$, a tetrabutyl ammonium cation $(TBA^+)$, and a tetrahexyl ammonium cation $(THA^+)'$.

12. An electrolyte for use in a lithium secondary battery, comprising an alkyl ammonium salt having a cation of the following Formula 1, a lithium salt, and an organic solvent:

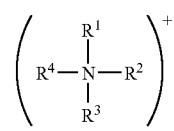

Formula 1 wherein $R^1$ to $R^4$ are independently a $C_1$ to $C_6$ alkyl, a $C_2$ to $C_6$ alkenyl, or substituents thereof, wherein the organic solvent includes at least one of dimethoxy ethane, dioxolane, and mixtures thereof.

13. The electrolyte of claim 12, wherein the electrolyte is used in a lithium-sulfur battery.

14. A lithium secondary battery comprising an electrolyte which includes an alkyl ammonium salt having a cation of the following Formula 1, a lithium salt, and an organic solvent:

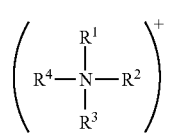

Formula 1 wherein $R^1$ to $R^4$ are independently a $C_1$, to $C_6$ alkyl, a $C_2$ to $C_6$ alkenyl, or substituents thereof and wherein the lithium-secondary battery is a lithium-sulfur battery.

* * * * *

UNITED STATES PATENT AND TRADEMARK OFFICE
CERTIFICATE OF CORRECTION

PATENT NO.       : 7,247,404 B2                                    Page 1 of 1
APPLICATION NO.  : 10/659363
DATED            : July 24, 2007
INVENTOR(S)      : Yongju Jung et al.

It is certified that error appears in the above-identified patent and that said Letters Patent is hereby corrected as shown below:

Column 7, line 35 claim 4
insert --natural-- after "are".

Column 8, line 14 claim 11
delete "'".

Column 8, line 46 claim 14
delete "," first occurrence.

Signed and Sealed this

Twentieth Day of November, 2007

JON W. DUDAS
*Director of the United States Patent and Trademark Office*